US005738745A

United States Patent [19]
Hudson et al.

[11] Patent Number: 5,738,745
[45] Date of Patent: Apr. 14, 1998

[54] METHOD OF IMPROVING THE PHOTOSTABILITY OF POLYPROPYLENE COMPOSITIONS

[75] Inventors: Robert Leslie Hudson; Mary Lucille DeLucia, both of Roswell, Ga.

[73] Assignee: Kimberly-Clark Worldwide, Inc., Neenah, Wis.

[21] Appl. No.: 562,722

[22] Filed: Nov. 27, 1995

[51] Int. Cl.⁶ .............................. D01F 6/06; D04H 1/54; C08L 23/12

[52] U.S. Cl. ................... 156/167; 156/62.4; 156/244.11; 525/194; 525/240; 264/DIG. 29

[58] Field of Search ................... 156/62.4, 167, 156/244.11; 522/46; 525/192, 194, 240; 264/DIG. 29

[56] References Cited

U.S. PATENT DOCUMENTS

| | | |
|---|---|---|
| 3,016,599 | 1/1962 | Perry, Jr. . |
| 3,213,881 | 10/1965 | Timmons et al. . |
| 3,271,340 | 9/1966 | Shearer, Jr. et al. . |
| 3,341,394 | 9/1967 | Kinney . |
| 3,551,943 | 1/1971 | Staton et al. . |
| 3,607,616 | 9/1971 | Barbehenn et al. . |
| 3,608,001 | 9/1971 | Harrison et al. . |
| 3,650,866 | 3/1972 | Prentice . |
| 3,655,862 | 4/1972 | Dorschner et al. . |
| 3,689,597 | 9/1972 | Mahlman . |
| 3,692,618 | 9/1972 | Dorschner et al. . |
| 3,704,198 | 11/1972 | Prentice . |
| 3,705,068 | 12/1972 | Dobo et al. . |
| 3,755,527 | 8/1973 | Keller et al. . |
| 3,802,817 | 4/1974 | Matsuki et al. . |
| 3,849,241 | 11/1974 | Butin et al. . |
| 3,853,651 | 12/1974 | Porte . |
| 3,865,897 | 2/1975 | Falender et al. . |
| 3,898,209 | 8/1975 | Watson et al. . |
| 4,064,605 | 12/1977 | Akiyama et al. . |
| 4,100,324 | 7/1978 | Anderson et al. . |
| 4,118,531 | 10/1978 | Hauser . |
| 4,189,338 | 2/1980 | Ejima et al. . |
| 4,265,801 | 5/1981 | Moody et al. . |
| 4,274,932 | 6/1981 | Williams et al. . |

(List continued on next page.)

FOREIGN PATENT DOCUMENTS

| | | |
|---|---|---|
| 0 303 895 | 2/1989 | European Pat. Off. . |
| 0 522 013 | 7/1993 | European Pat. Off. . |
| 0 591 676 | 4/1994 | European Pat. Off. . |
| 1116823 | 6/1968 | United Kingdom . |
| 94/09066 | 4/1994 | WIPO . |

OTHER PUBLICATIONS

Copy of Search Report for PCT/US96/17684 dated Jun. 6, 1997.

Japanese patent abstract for JP 03–131641 dated Jun. 5, 1991.

Research Disclosure 363047 dated Jun. 20, 1994, Class 525/240.

*Primary Examiner*—Michael W. Ball
*Assistant Examiner*—Sam Chuan Yao
*Attorney, Agent, or Firm*—William E. Maycock

[57] ABSTRACT

A method of improving the effectiveness of a photostabilizer in reducing the deleterious effects of actinic radiation on a polypropylene composition, which method involves compounding a melt-extrudable thermoplastic polypropylene composition having a melt flow rate in a range of from about 18 to about 100 g/10 minutes at a temperature of 230° C. and a load of 2.16 kg. The polypropylene composition includes a first thermoplastic polypropylene having a melt flow rate lower than 18 g/10 minutes at a temperature of 230° C. and a load of 2.16 kg, a polydispersity greater than about 2.6, and a Z-average molecular weight greater than about 300,000; a second thermoplastic polypropylene having a melt flow rate higher than 18 g/10 minutes at a temperature of 230° C. and a load of 2.16 kg, a polydispersity equal to or less than 2.6, and a Z-average molecular weight equal to or less than 300,000 as determined by gel permeation chromatography; and a photostabilizer. The weight ratio of the first polypropylene to the second polypropylene is in a range of from about 95:5 to about 10:90.

13 Claims, 5 Drawing Sheets

U.S. PATENT DOCUMENTS

| | | |
|---|---|---|
| 4,282,076 | 8/1981 | Boynton . |
| 4,287,108 | 9/1981 | Grigo et al. . |
| 4,296,022 | 10/1981 | Hudson . |
| 4,310,648 | 1/1982 | Shipley et al. . |
| 4,340,563 | 7/1982 | Appel et al. . |
| 4,359,562 | 11/1982 | Stein et al. . |
| 4,366,298 | 12/1982 | Kurz . |
| 4,368,305 | 1/1983 | Tanaka et al. . |
| 4,368,306 | 1/1983 | Kurz . |
| 4,375,531 | 3/1983 | Ross . |
| 4,434,204 | 2/1984 | Hartman et al. . |
| 4,446,090 | 5/1984 | Lovgren et al. . |
| 4,472,556 | 9/1984 | Lipowitz et al. . |
| 4,487,858 | 12/1984 | Lovgren et al. . |
| 4,514,534 | 4/1985 | DiNardo . |
| 4,535,113 | 8/1985 | Foster et al. . |
| 4,535,125 | 8/1985 | McCullough . |
| 4,547,551 | 10/1985 | Bailey et al. . |
| 4,563,259 | 1/1986 | Rayner . |
| 4,578,430 | 3/1986 | Davison . |
| 4,593,079 | 6/1986 | Rekers et al. . |
| 4,632,861 | 12/1986 | Vassilatos . |
| 4,663,220 | 5/1987 | Wisneski et al. . |
| 4,699,961 | 10/1987 | Gessell . |
| 4,741,944 | 5/1988 | Jackson et al. . |
| 4,766,029 | 8/1988 | Brock et al. . |
| 4,820,755 | 4/1989 | Webster . |
| 4,843,129 | 6/1989 | Spenadel et al. . |
| 4,851,284 | 7/1989 | Yamanoi et al. . |
| 4,857,251 | 8/1989 | Nohr et al. . |
| 4,888,369 | 12/1989 | Moore, Jr. . |
| 4,888,704 | 12/1989 | Topliss et al. . |
| 4,920,168 | 4/1990 | Nohr et al. . |
| 4,923,914 | 5/1990 | Nohr et al. . |
| 4,931,492 | 6/1990 | Foster et al. . |
| 4,948,820 | 8/1990 | Addeo et al. . |
| 4,960,810 | 10/1990 | Foster et al. . |
| 4,963,622 | 10/1990 | Heitz . |
| 4,970,280 | 11/1990 | Chiba et al. . |
| 4,980,227 | 12/1990 | Sekiguchi et al. . |
| 5,017,661 | 5/1991 | Coutant et al. . |
| 5,057,262 | 10/1991 | Nohr et al. . |
| 5,082,720 | 1/1992 | Hayes . |
| 5,093,415 | 3/1992 | Brady, III et al. . |
| 5,108,827 | 4/1992 | Gessner . |
| 5,114,646 | 5/1992 | Nohr et al. . |
| 5,116,915 | 5/1992 | Mamedov et al. . |
| 5,120,888 | 6/1992 | Nohr et al. . |
| 5,158,727 | 10/1992 | Kammual et al. . |
| 5,173,356 | 12/1992 | Eaton et al. . |
| 5,213,881 | 5/1993 | Timmons et al. . |
| 5,218,052 | 6/1993 | Cohen et al. . |
| 5,227,224 | 7/1993 | Ishikawa et al. . |
| 5,244,724 | 9/1993 | Antonacci et al. . |
| 5,258,129 | 11/1993 | Kato et al. . |
| 5,281,378 | 1/1994 | Kozulla . |
| 5,281,679 | 1/1994 | Jejelowo et al. . |
| 5,318,735 | 6/1994 | Kozulla . |
| 5,344,862 | 9/1994 | Nohr et al. . |
| 5,359,015 | 10/1994 | Jejelowo . |
| 5,368,919 | 11/1994 | Robeson . |
| 5,376,430 | 12/1994 | Swenson et al. . |
| 5,382,631 | 1/1995 | Stehling et al. . |
| 5,395,471 | 3/1995 | Obijeski et al. . |
| 5,405,917 | 4/1995 | Mueller, Jr. et al. . |
| 5,409,992 | 4/1995 | Eppert, Jr. . |
| 5,413,655 | 5/1995 | Nohr et al. . |
| 5,414,027 | 5/1995 | DeNicola, Jr. et al. . |
| 5,422,178 | 6/1995 | Swenson et al. . |

METHOD OF IMPROVING THE PHOTOSTABILITY OF POLYPROPYLENE COMPOSITIONS

BACKGROUND OF THE INVENTION

The present invention relates to polypropylene compositions and the preparation of articles therefrom.

Polypropylene, a polyolefin, is in extensive use for a variety of applications. For example, polypropylene is employed for the manufacture of nonwoven webs which generally are porous, textile-like materials which are composed primarily or entirely of fibers assembled in flat sheet form. A nonwoven web may be reinforced with a scrim, gauze, netting, yarn, or other conventional sheet material. A nonwoven web may be incorporated as a component in a composite structure or laminate.

Nonwoven webs currently are employed in a variety of such disposable absorbent or protective products as diapers; incontinent products; feminine care products, such as tampons and sanitary napkins; wipes; towels; sterilization wraps; medical drapes, such as surgical drapes and related items; medical garments, such as hospital gowns, shoe covers, and the like; and industrial workwear, to name but a few. The nonwoven webs can be utilized as a single layer or as a component of a multilayered laminate or composite. When a multilayered laminate or composite is present, often each layer is a nonwoven web. Such multilayered structures are particularly useful for wipes, towels, industrial workwear, medical garments, medical drapes, and the like.

In order to improve the performance of a nonwoven-containing product, it sometimes is necessary to modify certain characteristics of the fibers of which the web is composed. A classic example is the modification of the hydrophobicity of polyolefin fibers by a topical treatment of the web with a surfactant or through the use of a melt additive.

Because polypropylene is notorious for its lack of resistance to actinic radiation, and ultraviolet radiation in particular, efforts have been made to enhance or increase the photostability of the polymer, particularly for such applications as car covers, marine fabrics such as boat covers, and tenting materials. Thus, polypropylene articles intended for outdoor use (or any use which will involve exposure to sunlight) require inclusion in the polypropylene composition from which the articles are made of a photostabilizer. Although photostabilizers are effective in reducing the deleterious effects of actinic radiation on polypropylene, there still are opportunities for further improvement.

SUMMARY OF THE INVENTION

The present invention addresses some of the difficulties and problems discussed above by providing a method of improving the effectiveness of a photostabilizer in reducing the deleterious effects of actinic radiation on a polypropylene composition. The invention is grounded in the unexpected and surprising discovery that an increase in the effectiveness of a photostabilizer in reducing the deleterious effects of actinic radiation on a polypropylene composition may be achieved either through the use of two different melt flow rate polypropylenes in combination with a photostabilizer or by thermally cracking a thermoplastic polypropylene composition which includes a thermoplastic polypropylene having a melt flow rate lower than about 18 g/10 minutes, a photostabilizer, and a cracking catalyst.

One method involves compounding a thermoplastic polypropylene composition to give a melt-extrudable thermoplastic composition having a melt flow rate in a range of from about 18 to about 100 g/10 minutes at a temperature of 230° C. and a load of 2.16 kg. The polypropylene composition includes a first thermoplastic polypropylene, a second thermoplastic polypropylene, and a photostabilizer.

The first thermoplastic composition has a melt flow rate lower than 18 g/10 minutes at a temperature of 230° C. and a load of 2.16 kg, a polydispersity greater than about 2.6, and a Z-average molecular weight greater than about 300,000. For example, the first polypropylene may have a melt flow rate in a range of from about 1 to about 18 g/10 minutes at a temperature of 230° C. and a load of 2.16 kg.

The second thermoplastic polypropylene has a melt flow rate higher than 18 g/10 minutes at a temperature of 230° C. and a load of 2.16 kg, a polydispersity equal to or less than about 2.6, and a Z-average molecular weight equal to or less than about 300,000 as determined by gel permeation chromatography. As another example, the second polypropylene may have a melt flow rate in a range of from about 20 to about 50 g/10 minutes at a temperature of 230° C. and a load of 2.16 kg.

The weight ratio of the first polypropylene to the second polypropylene is in a range of from about 95:5 to about 10:90. By way of example, the weight ratio of the first polypropylene to the second polypropylene may be in a range of from about 60:40 to about 10:90. As still another example, the photostabilizer may be a hindered amine.

Alternatively, the effectiveness of the photostabilizer may be improved by thermally cracking a thermoplastic polypropylene composition which includes a thermoplastic polypropylene having a melt flow rate lower than about 18 g/10 minutes, a photostabilizer, and a cracking catalyst. Cracking is carried out with an amount of cracking catalyst and under conditions sufficient to give a melt-extrudable thermoplastic polypropylene composition having a melt flow rate in a range of from about 30 to about 90 g/10 minutes, a polydispersity greater than 2.6, and a Z-average molecular weight greater than 300,000 as determined by gel permeation chromatography.

The method further includes forming continuous fibers by melt extruding a compounded or cracked composition through a die. The continuous fibers thus produced may be quenched to a solid state and drawn. Moreover, the quenched and drawn fibers may be randomly deposited on a moving foraminous surface as a web of entangled fibers, thereby forming a nonwoven web.

The present invention also provides a melt-extruded fiber and nonwoven web prepared by the method of the present invention. The nonwoven web may be bonded by means which are well known to those having ordinary skill in the art. Also provided are fabrics suitable for outdoor applications, such as a tent fabric, a car cover, or a marine fabric such as a boat cover, each of which includes as a component thereof a nonwoven web prepared by the method of the present invention.

DETAILED DESCRIPTION OF THE INVENTION

Figure 1:
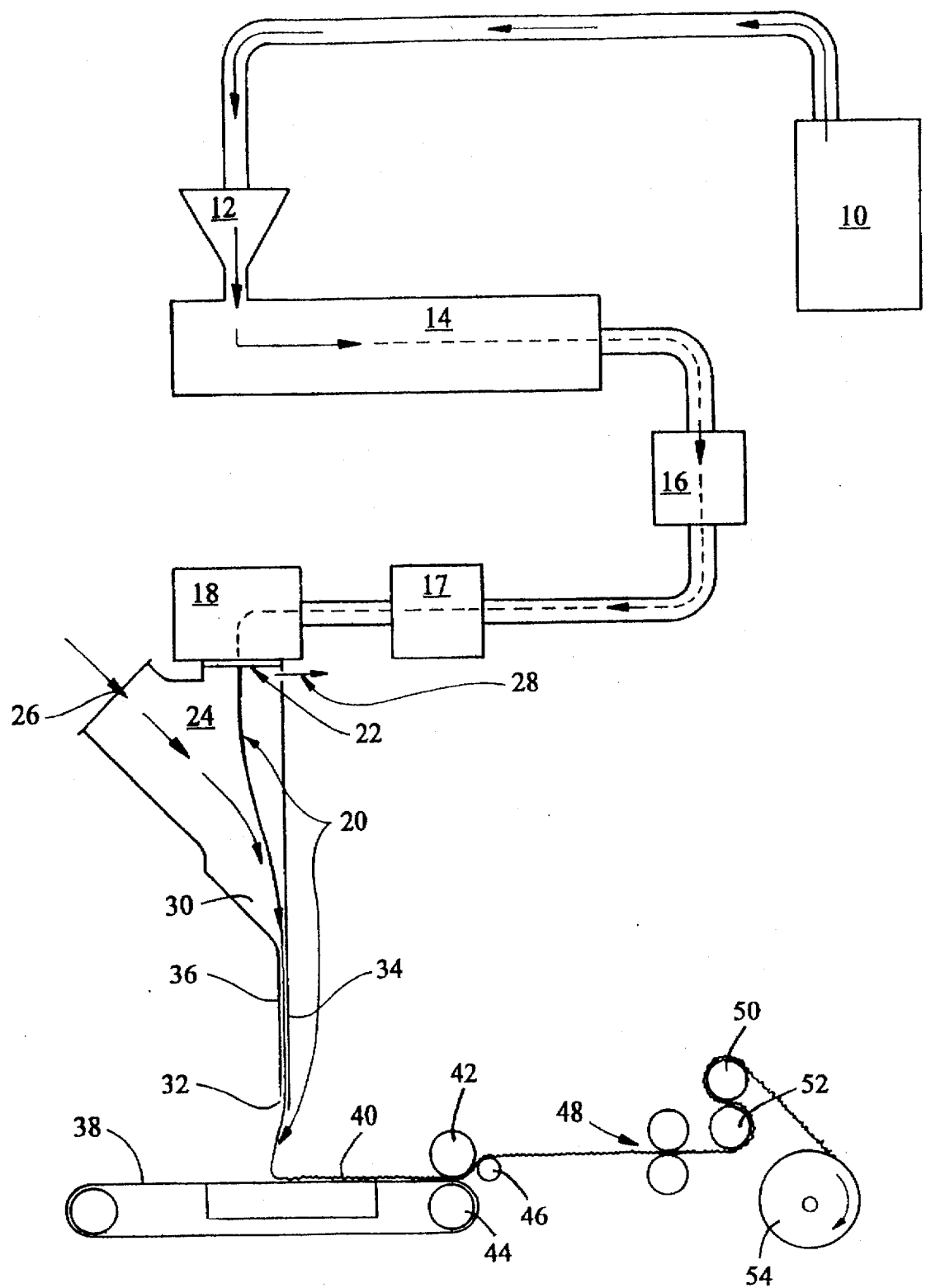
FIG. 1 is a generalized flow diagram illustrating a desired embodiment of a method of the present invention.

As used herein, the term "photostabilizer" is used herein to mean any organic compound which ameliorates the effect of actinic radiation. The photostabilizer may function by one or more of such mechanisms as radiation adsorption, excited state deactivation, and free radical scavenging. The term is intended to encompass both a single photostabilizer and a mixture of two or more photostabilizers. When mixtures of photostabilizers are employed, the several compounds may be members of the same class or different classes. Examples of classes of photostabilizers include, by way of illustration only, 2-hydroxybenzophenones, 2-hydroxybenzotriazoles, metal chelates, hydroxybenzoates, and hindered amines.

The term "actinic radiation" is used herein to mean radiation having a marked or significant photochemical effect. Such radiation typically includes the green, blue, violet, and ultraviolet regions of the electromagnetic spectrum, i.e., radiation having wavelengths in the range of from about 580 to about 100 nanometers. The term "ultraviolet radiation" is used herein to mean electromagnetic radiation having wavelengths in the range of from about 100 to about 400 nanometers.

Such terms as "melt-extrudable", "melt-extruded", and the like are meant to refer or relate to any melt extrusion process for forming a shaped article. The terms include, but are not limited to, the formation of fibers and nonwoven webs. For example, melt extrusion may be employed to form continuous fibers, followed by web formation, typically concurrently, on a foraminous support, e.g., a spunbonding process. The terms also refer or relate to processes in which web formation is a separate, independent step after fiber formation; nonwoven webs prepared by such processes include bonded carded webs, air-laid webs, wet-laid webs, and the like.

As used herein, the term "weight ratio" means the approximate relationship by weight of the amount of a first thermoplastic polypropylene to the amount of a second thermoplastic polypropylene in the composition of the present invention. More specifically, the weight ratio is the parts by weight of first thermoplastic polypropylene and the parts by weight of second thermoplastic polypropylene present in 100 parts by weight of composition, separated by a colon. The sum of the parts of first and second thermoplastic polypropylenes and the parts of other components will equal 100. Understandably, the weight ratio has no units.

The term "melt flow rate" refers to a melt flow rate determined in accordance with ASTM Method D 1238-82, Standard Test Method for Flow Rates of Thermoplastics by Extrusion Plastometer, using a Model VE 4-78 Extrusion Plastometer (Tinius Olsen Testing Machine Company, Willow Grove, Pa.) having an orifice diameter of 2.0955±0.0051 mm; unless specified otherwise, test conditions are at a temperature of 230° C. and a load of 2.16 kg.

The term "machine direction" is used herein to mean a direction which is the same as the direction of motion of a nonwoven web during its preparation. The term "cross-direction" is used herein to mean a direction which is the cross machine direction, i.e., a direction which is perpendicular to the machine direction.

As used herein, the term "compounding" or variations thereof means working the molten composition under the influence of heat and shear.

The term "cracking catalyst" is used herein to mean any catalyst which is used to thermally break down, or "crack", larger polymer molecules into smaller polymer molecules. Thus, cracking serves to increase the polydispersity of the polymer. Cracking catalysts in general are organic chemical compounds which generate free radicals when heated. The term is intended to encompass both the singular and the plural. Cracking catalysts suitable for use with polypropylene compositions typically are organic peroxides or hydroperoxides. Examples of organic peroxides include, by way of illustration only, 2,4-dichlorobenzoyl peroxide; isononanoyl peroxide; decanoyl peroxide; lauroyl peroxide; succinic acid peroxide; acetyl peroxide; benzoyl peroxide; 2,4-pentanedione peroxide; t-butyl peroctoate; di(n-propyl) peroxydicarbonate; di(sec-butyl) peroxydicarbonate; di(2-ethylhexyl) peroxydicarbonate; di(2-phenoxyethyl) peroxydicarbonate; di(4-t-butylcyclohexyl) peroxydicarbonate; t-butylperoxy isopropyl carbonate; alpha-cumylperoxyneodecanoate; alpha-cumylperoxypivalate; t-butyl peroxyneodecanoate; t-butyl peroxypivalate; t-amyl peroxypivalate; 1,5-dimethyl-2,5-di(2-ethylhexanoylperoxy)hexane; t-butylperoxy-2-ethylhexanoate; t-butylperoxyisobutyrate; t-butylperoxymaleic acid; 2,5-dimethyl-2,5-di(benzoylperoxy)hexane; t-butylperoxy acetate; t-butylperoxy benzoate; sec-butylperoxy benzoate; t-butyl perbenzoate; di-t-butyldiperoxy phthalate; t-amyl peroxyneodecanoate; t-amyl peroxypivalate; dicumyl peroxide; t-butyl cumyl peroxide; 2,5-dimethyl-2,5-di(t-butylperoxy) hexane; di-t-butyl peroxide; 2,5-dimethyl-2,5-di(t-butylperoxy)hexyne-3; acetyl cyclohexylsulfonyl peroxide; 2,5-dihydroperoxy-2,5-dimethylhexane; cumene hydroperoxide; t-butyl hydroperoxide; 1,1-di(t-butylperoxy)-3,3,5-trimethylcyclohexane; 1,1-di(t-butylperoxy)cyclohexane; 2,2-di(t-butylperoxy)butane; ethyl 3,3-di(t-butylperoxy) butyrate; 4,4-di(t-butylperoxy)-n-butyl valerate; and bis(t-butylperoxyisopropyl)benzene.

As already stated, the method of the present invention is a method of improving the effectiveness of a photostabilizer in reducing the deleterious effects of actinic radiation on a polypropylene composition. The method involves compounding a thermoplastic polypropylene composition to give a melt-extrudable thermoplastic composition having a melt flow rate in a range of from about 18 to about 100 g/10 minutes at a temperature of 230° C. and a load of 2.16 kg. By way of example, the melt flow rate of the melt-extrudable composition may be in a range of from about 19 to about 22 g/10 minutes.

The composition includes a first thermoplastic polypropylene, a second thermoplastic polypropylene, and a photostabilizer. The first thermoplastic polypropylene has a melt flow rate lower than 18 g/10 minutes at a temperature of 230° C. and a load of 2.16 kg. The second thermoplastic polypropylene has a melt flow rate higher than 18 g/10 minutes at a temperature of 230° C. and a load of 2.16 kg, a polydispersity equal to or less than 2.6, and a Z-average molecular weight equal to or less than 300,000 as determined by gel permeation chromatography. The weight ratio of the first polypropylene to the second polypropylene is in a range of from about 95:5 to about 10:90. For example, the weight ratio of the first polypropylene to the second polypropylene may be in a range of from about 80:20 to about 40:60.

As already stated, the composition will have a melt flow rate in a range of from about 18 to about 100 g/10 minutes. Such melt flow rate typically is a function of (a) the melt flow rate of the first thermoplastic polypropylene, (b) the melt flow rate of the second thermoplastic polypropylene, (c) the weight ratio of the first thermoplastic polypropylene to the second thermoplastic polypropylene, and (d) the amounts of thermal and shear energy applied to the composition during compounding. Consequently, one having ordinary skill in the art may readily obtain a composition having a desired melt flow rate in the required range. Even if commercially available thermoplastic polypropylenes have limited choices of melt flow rates, the desired composition melt flow rate may be obtained without undue experimentation by adjusting either or both of the weight ratio of the two thermoplastic polypropylenes and the amounts of thermal and shear energy applied during compounding. Although shear energy generates heat, there still is some flexibility in the compounding process since the amount of thermal energy in excess of that required to render the composition sufficiently molten may be controlled. Because thermal and shear energy preferentially break down the higher molecular weight polymer components, increasing the amounts of thermal and shear energy results in an increase in the melt flow rate of the composition and decreases in both the weight-average and Z-average molecular weights.

As already stated, the composition to be compounded includes a photostabilizer. Any of the known photostabilizers may be employed, such as 2-hydroxybenzophenones, 2-hydroxybenzotriazoles, metal chelates, hydroxybenzoates, and hindered amines. Desirably, the photostabilizer will be a hindered amine. In general, the photostabilizer will be present in an amount sufficient to protect the composition from the adverse effects of actinic radiation. For example, the composition may contain from about 0.3 to about 5 percent by weight of photostabilizer, based on the weight of polypropylenes present, although lower or higher amounts may be employed, if desired. As another example, the amount of photostabilizer employed may be in a range of from about 0.5 to about 3 percent by weight.

Compounding may be carried out in a twin-screw or other extruder in accordance with procedures well known to those having ordinary skill in the compounding art. Compounding may be carried out independent of a fiber spinning step. For example, the composition may be compounded and stored for future use. Alternatively, the composition may be blended immediately prior to fiber spinning and fed directly to the fiber spinning apparatus, in which case compounding occurs within the fiber spinning apparatus itself.

Alternatively, the improved effectiveness of the photostabilizer may be accomplished by thermally cracking a thermoplastic polypropylene composition which includes a thermoplastic polypropylene having a melt flow rate lower than about 18 g/10 minutes, a photostabilizer, and a cracking catalyst. Cracking is carried out with an amount of cracking catalyst and under conditions sufficient to give a melt-extrudable thermoplastic polypropylene composition having a melt flow rate in a range of from about 30 to about 90 g/10 minutes, a polydispersity greater than 2.6, and a Z-average molecular weight greater than 300,000 as determined by gel permeation chromatography.

In general, the amount and type of cracking catalyst are selected so as to give a desired melt flow rate, polydispersity, and Z-average molecular weight. Desirably, the cracking catalyst will be a peroxide and the amount of cracking catalyst may be in a range of from about 0.05 to about 3 percent by weight, based on the total weight of the composition to be cracked, depending upon the initial or original melt flow rate of the polypropylene. The amount of cracking catalyst employed typically will be inversely proportional to the melt flow rate of the polypropylene.

After compounding or cracking a composition as described above, it may be melt extruded. For example, a compounded composition may be melt extruded to form fibers. By way of example, continuous fibers may be formed by extruding the compounded thermoplastic composition through a die. Although the die may have any desired configuration, it most often will have a plurality of orifices arranged in one or more rows extending the full machine width. Such orifices may be circular or noncircular in cross-section.

The resulting continuous fibers then may be drawn, typically by entraining them in a fluid stream having a sufficiently high velocity. The continuous fibers may be cooled in a quenching fluid prior to drawing; the quenching fluid usually is low pressure air. The fluid stream which draws the fibers, usually air, may be a stream of high velocity air separate from the quenching fluid, or it may be a portion of the quenching fluid which is accelerated by passage into a narrow nozzle.

The drawn fibers may be collected on a moving foraminous surface as a web of entangled fibers. The foraminous surface may be, by way of example only, a revolving drum or a continuous belt or wire screen; the latter is most commonly used on commercial-scale equipment. The fibers may be monocomponent fibers or conjugate fibers. Moreover, the fiber cross-section may be circular or noncircular.

The resulting nonwoven web may be bonded by means which are well known to those having ordinary skill in the art. For example, the web may be pattern bonded by the application of heat and pressure.

Some aspects of the method of the present invention are described in more detail in U.S. Pat. Nos. 3,016,599, 3,704, 198, 3,755,527, 3,849,241, 3,341,394, 3,655,862, 3,692,618, 3,705,068, 3,802,817, 3,853,651, 4,064,605, 4,340,563, 4,434,204, 4,100,324, 4,118,531, and 4,663,220, all of which are incorporated herein by reference.

The method of the present invention is further described by reference to FIG. 1 which is a generalized flow diagram illustrating a desired embodiment of the process of the present invention. Of course, other embodiments may be utilized, such as that described in the examples.

Turning now to FIG. 1, the compounded thermoplastic composition is fed from a supply 10 to a hopper 12, then through an extruder 14, a filter 16, and a metering pump 17 to a die head 18 having a die face 22 with a plurality of orifices arranged in one or more rows generally in the cross-machine direction. As the continuous fibers emerge from the die face 22, they form a curtain of fibers 20 directed into a quench chamber 24. In the quench chamber 24, the fibers 20 are contacted with air or other cooling fluid through an inlet 26. The quenching fluid is maintained at a temperature which is lower than the temperature of the filaments 20, typically at ambient temperature, e.g., in the range of from about 4° C. to about 55° C. The quenching fluid is supplied under low pressure, i.e., less than about 12 psi, and preferably less than about 2 psi, and a portion is directed through the curtain of filaments 20 and removed as exhaust through a port 28. The proportion of quenching fluid supplied that is discharged as exhaust will depend upon the composition being used and the rapidity of quenching needed to give the desired fiber characteristics, such as denier, tenacity, and the like. In general, the greater the amount of fluid exhausted, the larger the resulting filament denier and, conversely, the lower the exhaust fluid ratio, the lower the filament denier.

As quenching is completed, the curtain of filaments 20 is directed through a smoothly narrowing lower end 30 of the quenching chamber into a nozzle 32 where the quenching fluid attains a velocity of from about 45 to about 245 meters per second. The nozzle 32 extends the full width of the machine, equivalent to the width of the die 22. The nozzle 32 typically is formed by a stationary wall 34 and a movable wall 36, both of which also span the width of the machine. The function of the movable wall 36 is described in U.S. Pat. No. 4,340,563, noted above.

After exiting the nozzle 32, the filaments 20 are collected on a moving foraminous surface such as an endless screen or belt 38 to form a nonwoven web 40. Before being removed from the belt or screen 38, the web 40 is passed under a compaction roll 42, optionally in conjunction with a guide roll 46. The compaction roll 42 conveniently is opposed by the forward drive and/or support roll 44 for the continuous foraminous belt or wire screen 38. Upon exiting the compaction roll 42, the web 40 typically is bonded at the roll nip 48. The web 40 then is passed around the tensioning rolls 50 and 52, after which the web 40 is wound on a take-up roll 54.

The present invention is further described by the examples which follow. Such examples, however, are not to be construed as limiting in any way either the spirit or the scope of the present invention.

EXAMPLE 1

This example describes the preparation of spunbonded nonwoven webs on an experimental spunbonding apparatus essentially as described in U.S. Pat. No. 3,655,862.

The first and second thermoplastic polypropylenes employed in the example are referred to herein as Polymer I-A and Polymer II-A, respectively. Polymer I-A was a polypropylene having a melt flow rate of 12 g/10 minutes (Exxon Chemical Americas, Houston, Tex. 77079). Polymer II-A was PF-301 polypropylene (Himont USA, Inc., Wilmington, Del.). According to the manufacturer, the polymer has a melt flow rate of 35 g/10 minutes.

The photostabilizer employed was a polymeric hindered amine, Chimassorb 944 (Photostabilizer A). It was utilized as a mixture of 15 percent by weight of the photostabilizer and 85 percent by weight of Polymer II-A.

Three compositions were prepared as summarized in Table 1. The values given in the columns under the heading "Parts Designated Polymer" are parts by weight per 100 parts of the composition. In the table, "PS-A" means Photostabilizer A. The table has been adjusted to allow for the inclusion of Polymer II-A with the photostabilizer. The amount of the photostabilizer composition used in each case was 6.7 parts per 100 parts of melt-extrudable composition, which is equivalent to 1 part of Chimassorb 944 or Photostabilizer A. Thus, this amount of Photostabilizer A is shown in the table under the column "Parts PS-A." The 5.7 parts of the photostabilizer composition which is Polymer II-A is included in the table under the Polymer II-A column. The compositions which consisted essentially of either Polymer I-A or Polymer II-A and photostabilizer served as controls, and are identified in the table as Controls A and B, respectively.

TABLE 1

Summary of Melt-Extrudable Compositions

| Composition | Parts Polymer | | Parts PS-A |
|---|---|---|---|
| | I-A | II-A | |
| Control A | — | 99.0 | 1.0 |
| 1-A | 50.0 | 49.0 | 1.0 |
| Control B | 93.3 | 5.7 | 1.0 |

The appropriate amounts of pellets of the first and second thermoplastic polypropylenes and photostabilizer were blended in a stainless steel beaker by means of a paint shaker. The blends then were extruded and pelletized twice on a one-inch Killion extruder with blending after each extrusion.

Each composition was melt-extruded to form a spunbonded nonwoven web. The experimental spunbonding apparatus employed had a 1.25-inch (about 3.2-cm) Killion extruder and a single Lurgi gun oriented at a 45° angle relative to the machine direction (the forming angle). The apparatus produced a web having a nominal width of about 6 inches (about 15 cm); the web was trimmed on each side in the machine direction to give a web having an approximately 5-inch (about 13-cm) width. The web had a basis weight of 1 ounce per square yard or osy (about 34 grams per square meter or gsm). Each web was formed on a polypropylene carrier sheet and thermally point bonded off-line. Two portions of each web were placed together with the machine directions of the webs being parallel and the carrier sheets on the outside, and thermally point bonded together, resulting in the portions having their forming angles at right angles to each other. Thermal point bonding was carried out as described in U.S. Pat. No. 3,855,046 at a temperature of 134° C., with the bonded area constituting about 18 percent of the surface area of the sheets. Both carrier sheets then were removed to yield a 2-osy (about 68-gsm) fabric having good cross-directional strength.

Samples of each web were cut into 5×10 inch (about 13×25 cm) strips and exposed to the sun at the South Florida Test Service facility in Miami at 45° South. The samples were tested before and after exposure in the cross direction for tensile strength by modification of Federal Test Method 5000 (a 0.5 inch or about 1.7 cm span and a draw rate of 2 inches or about 5 cm per minute). Test strips 1 inch (about 2.5 cm) wide were cut parallel with the cross direction. In each case, the tensile strength result in the cross direction was calculated as a percent of the tensile strength of the web before exposure, as follows:

Percent Retention=$100(TS_n/TS_o)$ in which $TS_n$ represents the tensile strength of the sample after n months of exposure to the sun in Florida and $TS_o$ represents the tensile strength of the sample before exposure to the sun, i.e., the tensile strength of the sample when n equals zero. The results are summarized in Table 2.

TABLE 2

Summary of Percent Retention
of Tensile Strength Results

| | Percent Retention[b] | | |
|---|---|---|---|
| Exposure[a] | Control A | Comp. 1-A | Control B |
| 3 | 80 | 91 | 83 |
| 6 | 56 | 88 | 84 |
| 9 | 62 | 85 | 77 |
| 12 | 50 | 87 | 73 |
| 15 | 57 | 76 | 74 |
| 18 | 54 | 69 | 65 |
| 21 | 37 | 73 | 57 |
| 24 | 43 | 80 | 68 |

[a] Months of exposure to Florida sun.
[b] Percent retention of tensile strength.

Figure 2:
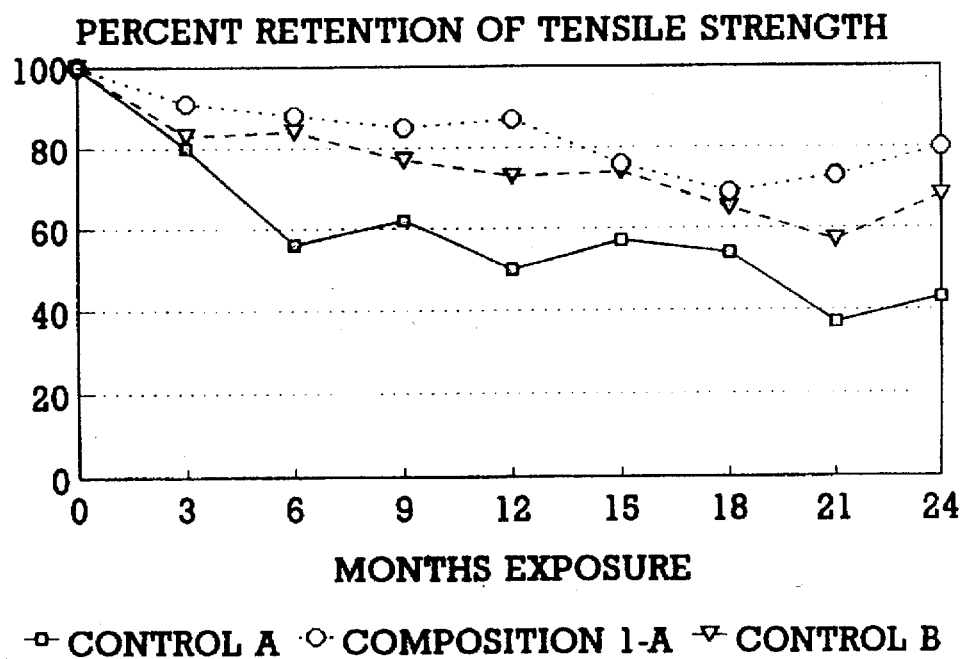
FIGS. 2 and 3 are line graphs illustrating the percent retention of tensile strength versus months of exposure to sunlight for control nonwoven webs and nonwoven webs prepared in accordance with the present invention.

To aid in an understanding of the results summarized in the table, the data were plotted as line graphs of months of exposure to the Florida sun versus the percent retention of tensile strength, as shown in FIG. 2. As FIG. 2 clearly shows, the mixture of Polymers I-A and II-A (Composition 1-A) resulted in improved stability against actinic radiation, compared with either Control B (Polymer I-A) or Control A (Polymer II-A). The combination of Polymer I-A and photostabilizer (Control B) was more stable against actinic radiation than was the combination of Polymer II-A and photostabilizer (Control A). However, one would have expected the stability of a mixture of the two polymers to be intermediate the stabilities of the two polymers. FIG. 2 shows, however, that the mixture unexpectedly resulted in a stability which exceeded that of either polymer. In other words, the effectiveness of the photostabilizer in reducing the deleterious effects of actinic radiation on a polypropylene composition was increased by using two different melt flow rate polypropylenes.

EXAMPLE 2

The procedure of Example 1 was repeated, except that the compositions also included 4 percent by weight of a pigment, SCC-3283 (Standridge Color Corporation, Social Circle, Ga.), which consisted of 25 percent by weight of calcined mixed oxides (V-9119, from Ferro Corporation, Bedford, Ohio) in Polymer II-A. Four compositions were prepared as summarized in Table 3. Again, the values given in the columns under the heading "Parts Designated Polymer" are parts by weight per 100 parts of the composition, and "PS-A" means the Photostabilizer A employed in Example 1. The table has been adjusted as described in Example 1. Consequently, the parts of pigment in each composition is shown as parts of V-9119, rather than parts of SCC-3283 which includes Polymer II-A. Thus, Polymer II-A which actually was present with both the photostabilizer and the pigment is included under the "Polymer II-A" column.

TABLE 3

Summary of Melt-Extrudable Compositions

| | Parts Polymer | | Parts | Parts |
|---|---|---|---|---|
| Composition | I-A | II-A | PS-A | V-9119 |
| Control C | — | 98.0 | 1.0 | 1.0 |
| 2-A | 10.0 | 88.0 | 1.0 | 1.0 |
| 2-B | 30.0 | 68.0 | 1.0 | 1.0 |
| 2-C | 50.0 | 48.0 | 1.0 | 1.0 |

Nonwoven webs were prepared and tested as described in Example 1. The results are summarized in Table 4.

TABLE 4

Summary of Percent Retention
of Tensile Strength Results

| | Percent Retention[b] | | | |
|---|---|---|---|---|
| Exposure[a] | Control C | Comp. 2-A | Comp. 2-B | Comp. 2-C |
| 2 | 91 | 95 | 100 | 95 |
| 4 | 71 | 94 | 84 | 95 |
| 6 | 63 | 89 | 62 | 73 |
| 8 | 48 | 57 | 60 | 66 |
| 10 | 54 | 81 | 71 | 73 |
| 12 | 55 | 67 | 64 | 70 |
| 14 | 47 | 61 | 65 | 74 |
| 16 | 43 | 53 | 64 | 70 |
| 18 | 42 | 53 | 62 | 71 |
| 20 | 42 | 49 | 63 | 73 |
| 22 | 41 | 55 | 68 | 70 |
| 24 | 46 | 52 | 58 | 64 |
| 26 | 43 | 50 | 54 | 64 |
| 28 | 40 | 50 | 56 | 60 |
| 30 | 38 | 47 | 48 | 55 |
| 32 | 36 | 41 | 45 | 54 |
| 34 | 37 | 41 | 46 | 49 |
| 36 | 34 | 38 | 47 | 50 |

[a] Months of exposure to Florida sun.
[b] Percent retention of tensile strength.

Figure 3:
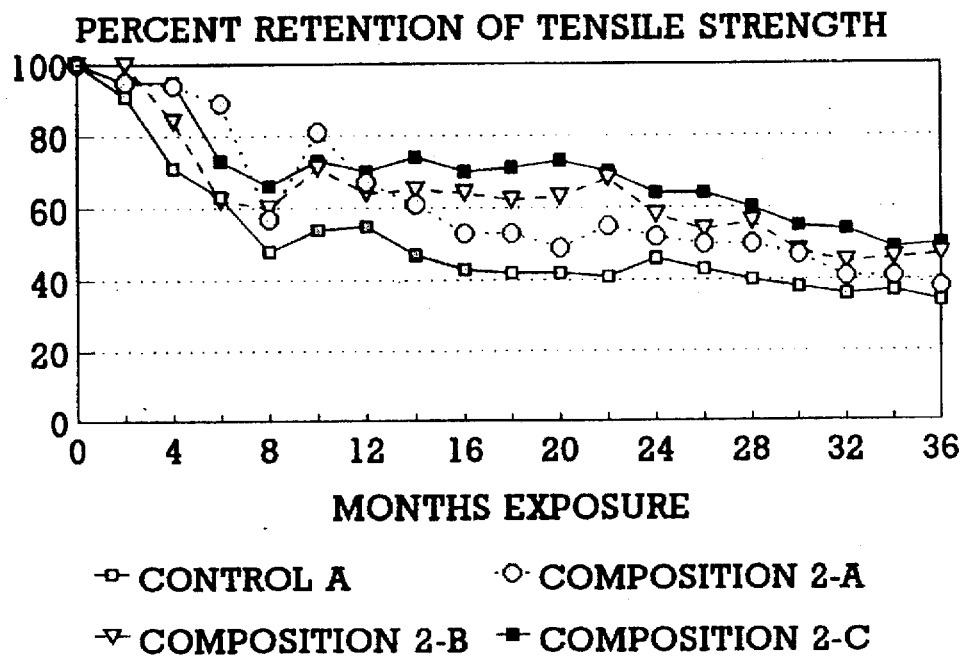

To aid in an understanding of the results summarized in the table, the data have been plotted as line graphs as described in Example 1. The plots are shown in FIG. 3. FIG. 3 clearly shows that mixtures of Polymers I-A and II-A, in conjunction with a photostabilizer, resulted in improved stability against actinic radiation, compared with Polymer II-A alone. The extent of such improved stability was directly proportional to the amount of Polymer I-A present in the composition.

It may be mentioned that Polymer II-A was used as the sole control in this example as it has a melt flow rate which is typical of polypropylenes utilized for the commercial production of polypropylene nonwoven webs.

EXAMPLE 3

In this example, the composition employed consisted of Pro-Fax 6301 polypropylene (Polymer I-B, Himont), which had a melt flow rate of 10–14 g/10 minutes, 1 percent by weight of the polymeric hindered amine photostabilizer, Chimassorb 944, utilized in Example 1, and varying amounts of a cracking catalyst, a peroxide concentrate, Q-858 (Fina Oil and Chemical Company, Dallas, Tex.), which consisted of 5 percent by weight of alpha, alpha'-bis (t-butylperoxy)diisopropylbenzene (Perkadox® 14, Noury Chemicals, Akzo Chemie America, Chicago, Ill.) in a propylene copolymer. In addition, each composition also contained 0.1 percent by weight, based on the total weight of the composition, of an organophosphorus stabilizer, bis(2,4-dit-butylphenyl) pentaerythritol diphosphite (Ultranox® 626, General Electric Company, Parkersburg, W. Va.). The various compositions are summarized in Table 5. Each composition contained 1 part by weight of Chimassorb 944 (Photostabilizer A).

TABLE 5

Summary of Melt-Extrudable Compositions

| Composition | Polymer | Parts Q-858 | Parts PS-A |
|---|---|---|---|
| 3-A | I-B | 0.05 | 1.0 |
| 3-B | I-B | 0.15 | 1.0 |
| 3-C | I-B | 0.30 | 1.0 |
| 3-D | I-B | 0.45 | 1.0 |
| 3-E | I-B | 0.60 | 1.0 |
| 3-F | I-B | 0.75 | 1.0 |

Each composition was thermally cracked. Cracking involved first blending polymer, photostabilizer, and cracking catalyst as described in Example 1. The resulting blend then was extruded in a Killion extruder, also as described in Example 1, with a residence time of about 1 minute and at a temperature of about 234° C.

Nonwoven webs were prepared and tested as described in Example 1. The results are summarized in Table 6. Included in the table is the melt flow rate (MFR) in g/10 minutes of each nonwoven web before being subjected to exposure in Florida. The low melt flow rate of Polymer I-B required such a high melt extrusion temperature to form a web that significant thermal degradation of the polymer occurred as indicated by a melt flow rate for the resulting spunbonded web of 113 g/10 minutes. For this, reason, the exposure data for the nonwoven web prepared form Polymer I-B were not included in Table 6.

TABLE 6

Summary of Percent Retention of Tensile Strength Results

| | Percent Retention[b] by Composition | | | | | |
|---|---|---|---|---|---|---|
| Exposure[a] | 3-A | 3-B | 3-C | 3-D | 3-E | 3-F |
| MFR | 57 | 71 | 101 | 103 | 110 | 126 |
| 2 | 84 | 92 | 100 | 67 | 100 | 85 |
| 4 | 81 | 92 | 92 | 63 | 92 | 74 |
| 6 | 68 | 85 | 88 | 56 | 61 | 65 |
| 8 | 70 | 89 | 92 | 54 | 60 | 60 |
| 10 | 68 | 84 | 81 | 56 | 66 | 61 |
| 12 | 72 | 90 | 91 | 54 | 72 | 60 |
| 14 | 68 | 97 | 83 | 57 | 71 | 56 |
| 16 | 64 | 82 | 90 | 59 | 53 | 51 |
| 18 | 77 | 82 | 80 | 69 | 60 | 53 |
| 20 | 71 | 83 | 83 | 65 | 61 | 53 |
| 22 | 64 | 85 | 85 | 60 | 62 | 53 |
| 24 | 59 | 72 | 79 | 61 | 60 | 50 |
| 26 | 67 | 80 | 76 | 60 | 57 | 48 |
| 28 | 94 | 84 | 72 | 59 | 53 | 46 |

[a]Months of exposure to Florida sun.
[b]Percent retention of tensile strength.

Figure 4:
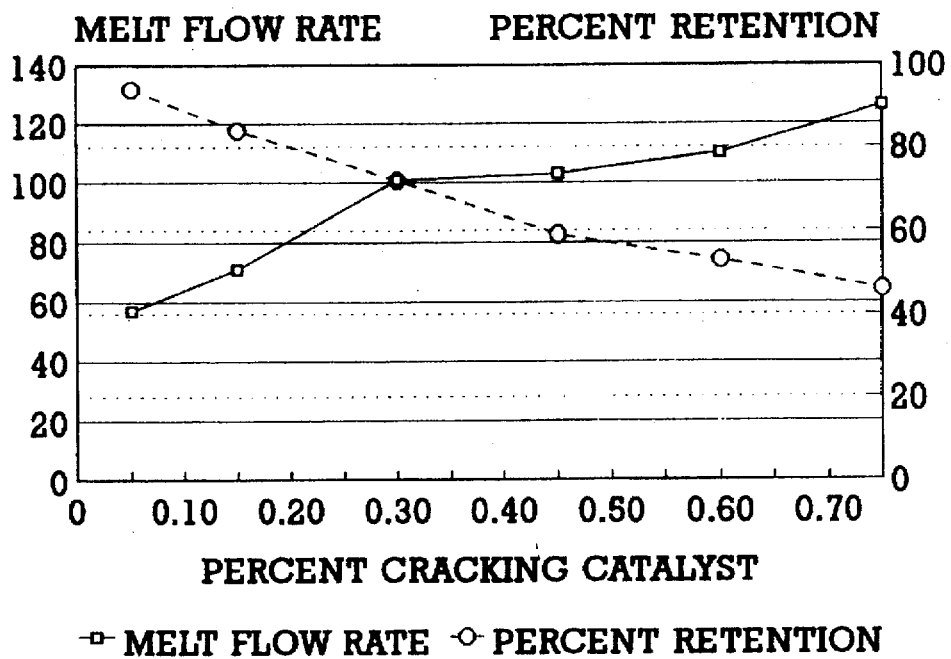
FIGS. 4–9, inclusive, are line graphs in which both melt flow rate and the percent retention of tensile strength are plotted against the percent of cracking catalyst employed in the thermal cracking of polypropylene compositions utilizing six different melt flow rate polypropylenes.

To aid in an understanding of the results summarized in Table 6, line graphs in which both melt flow rate and the percent retention of tensile strength versus the percent of cracking catalyst employed have been plotted, as shown in FIG. 4. In FIG. 4, the x-axis indicates the percent of cracking catalyst, the left y-axis indicates the melt flow rate, and the right y-axis indicates the percent retention of tensile strength after 28 months of exposure.

As the percent of cracking catalyst increased, the melt flow rate gradually increased to a value of 126 g/10 minutes.

At the same time, the percent retention of tensile strength gradually decreased. FIG. 4 indicates that, in order to obtain the best possible percent retention of tensile strength, the thermal cracking procedure should utilize no more than about 0.30 percent by weight of the cracking catalyst. FIG. 4 also indicates that the amount of cracking catalyst desirably will be in a range of from about 0.025 to about 0.20 percent by weight, with the optimum amount being 0.05 percent by weight. These ranges of cracking catalyst also apply to the melt flow rate which desirably will be in a range of from about 57 to about 80 g/10 minutes. FIG. 4 indicates that the optimum melt flow rate is about 57 g/10 minutes.

It should be understood that the results summarized in Table 6 and shown in FIG. 4 apply only for the polymer and cracking catalyst employed in this example. While similar results may be expected with other catalysts, the desired and optimum amounts of catalyst indicated by FIG. 4 very likely will vary. These principles also apply to the examples which follow.

EXAMPLE 4

The procedure of Example 3 was repeated, except that the Pro-Fax 6301 polypropylene was replaced with Pro-Fax 6401 (Polymer I-C, Himont), which had a melt flow rate of 4–6 g/10 minutes. The melt flow rate of Polymer I-C, of course, precludes melt extrusion to form a nonwoven web. The compositions are summarized in Table 7 and the results are summarized in Table 8.

TABLE 7

Summary of Melt-Extrudable Compositions

| Composition | Polymer | Parts Q-858 | Parts PS-A |
|---|---|---|---|
| 4-A | I-C | 0.08 | 1.0 |
| 4-B | I-C | 0.15 | 1.0 |
| 4-C | I-C | 0.30 | 1.0 |
| 4-D | I-C | 0.45 | 1.0 |
| 4-E | I-C | 0.60 | 1.0 |
| 4-F | I-C | 1.00 | 1.0 |

TABLE 8

Summary of Percent Retention of Tensile Strength Results

| | Percent Retention[b] by Composition | | | | | |
|---|---|---|---|---|---|---|
| Exposure[a] | 4-A | 4-B | 4-C | 4-D | 4-E | 4-F |
| MFR | 42 | 56 | 87 | 74 | 92 | 115 |
| 2 | 100 | 100 | 100 | 73 | 79 | 89 |
| 4 | 100 | 73 | 100 | 74 | 68 | 77 |
| 6 | 100 | 100 | 100 | 64 | 62 | 74 |
| 8 | 95 | 63 | 67 | 54 | 60 | 63 |
| 10 | 88 | 76 | 73 | 57 | 63 | 67 |
| 12 | 81 | 76 | 72 | 62 | 60 | 66 |
| 14 | 88 | 88 | 94 | 54 | 49 | 58 |
| 16 | 100 | 88 | 67 | 63 | 50 | 57 |
| 18 | 98 | 86 | 91 | 62 | 53 | 54 |
| 20 | 85 | 80 | 79 | 62 | 53 | 52 |
| 22 | 71 | 73 | 67 | 51 | 53 | 50 |
| 24 | 88 | 81 | 73 | 56 | 53 | 49 |
| 26 | 98 | 71 | 71 | 57 | 50 | 48 |
| 28 | 100 | 60 | 69 | 57 | 51 | 47 |

[a]Months of exposure to Florida sun.
[b]Percent retention of tensile strength.

Figure 5:
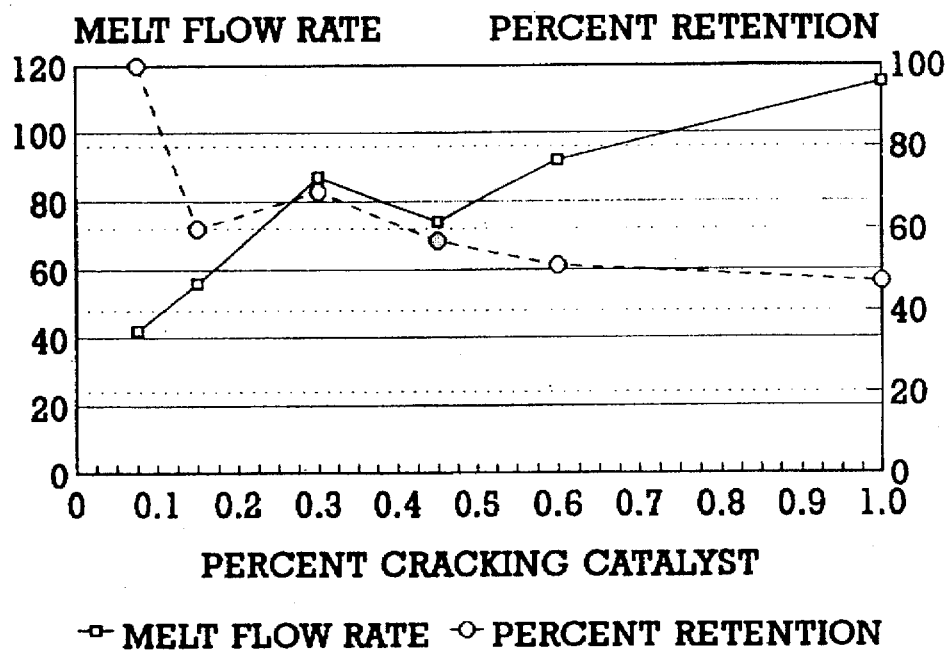

Line graphs in which both melt flow rate and the percent retention of tensile strength versus the percent of cracking catalyst employed were plotted as described in Example 3. The graphs are shown in FIG. 5.

The excellent correlation of melt flow rate and percent retention with percent of cracking catalyst seen in Example 3 was not observed in this example, although the same trends generally were apparent. For example, as the percent of cracking catalyst increased, the melt flow rate typically gradually increased and the percent retention of tensile strength gradually decreased. The percent retention plot suggests that the amount of cracking catalyst in general should not be more than about 0.1 percent by weight, whereas the melt flow rate plot suggests a broader range of cracking catalyst, i.e., less than about 0.6 percent by weight. However, the desired melt flow rate appears to be from about 40 to about 50 g/10 minutes; this range correlates well with the optimum percent retention of tensile strength range.

EXAMPLE 5

The procedure of Example 3 was repeated, except that the Pro-Fax 6301 polypropylene was replaced with Pro-Fax 6501 (Polymer I-D, Himont), which had a melt flow rate of 2–3 g/10 minutes. The compositions are summarized in Table 9 and the results are summarized in Table 10.

TABLE 9

Summary of Melt-Extrudable Compositions

| Composition | Polymer | Parts Q-858 | Parts PS-A |
|---|---|---|---|
| 5-A | I-D | 0.15 | 1.0 |
| 5-B | I-D | 0.30 | 1.0 |
| 5-C | I-D | 0.45 | 1.0 |
| 5-D | I-D | 0.60 | 1.0 |
| 5-E | I-D | 0.75 | 1.0 |
| 5-F | I-D | 1.00 | 1.0 |
| 5-G | I-D | 1.25 | 1.0 |

TABLE 10

Summary of Percent Retention of Tensile Strength Results

Percent Retention[b] by Composition

| Exposure[a] | 5-A | 5-B | 5-C | 5-D | 5-E | 5-F | 5-G |
|---|---|---|---|---|---|---|---|
| MFR | 100 | 45 | 51 | 56 | 70 | 76 | 104 |
| 2 | 98 | 98 | 100 | 97 | 87 | 71 | 88 |
| 4 | 89 | 92 | 100 | 100 | 85 | 70 | 84 |
| 6 | 84 | 79 | 100 | 76 | 89 | 59 | 72 |
| 8 | 79 | 93 | 94 | 100 | 95 | 59 | 72 |
| 10 | 89 | 100 | 95 | 100 | 89 | 65 | 66 |
| 12 | 89 | 89 | 100 | 100 | 93 | 76 | 67 |
| 14 | 89 | 100 | 100 | 100 | 92 | 51 | 66 |
| 16 | 78 | 100 | 84 | 100 | 88 | 67 | 58 |
| 18 | 82 | 82 | 94 | 97 | 93 | 53 | 63 |
| 20 | 76 | 88 | 87 | 98 | 92 | 59 | 62 |
| 22 | 69 | 93 | 80 | 100 | 91 | 66 | 60 |
| 24 | 93 | 91 | 87 | 97 | 87 | 75 | 66 |
| 26 | 74 | 95 | 85 | 93 | 87 | 72 | 61 |
| 28 | 55 | 99 | 83 | 89 | 87 | 68 | 55 |

[a]Months of exposure to Florida sun.
[b]Percent retention of tensile strength.

Figure 6:
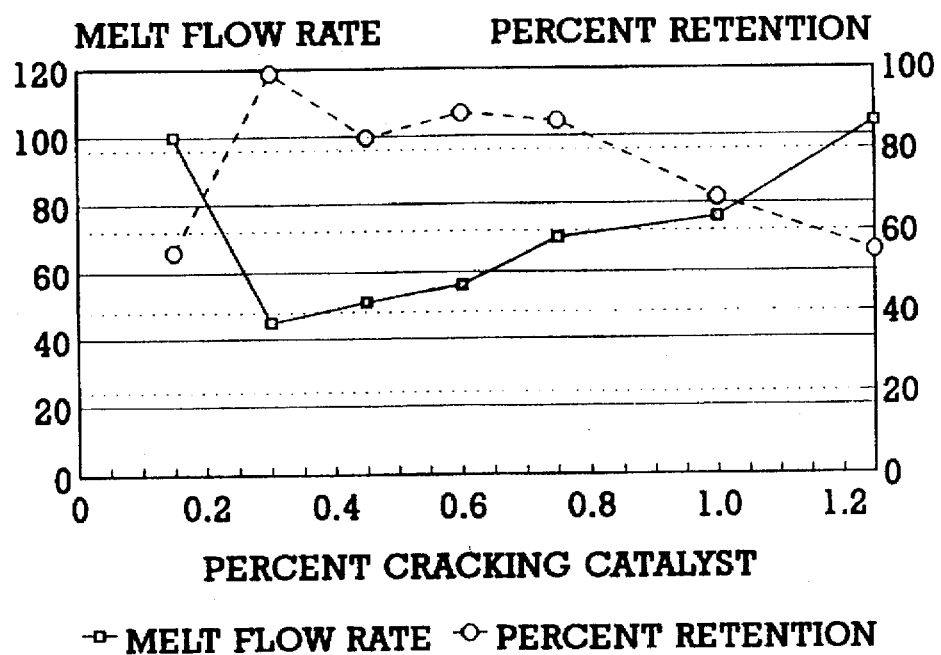

Line graphs in which both melt flow rate and the percent retention of tensile strength versus the percent of cracking catalyst employed were plotted as described in Example 3. The graphs are shown in FIG. 6.

The correlation of melt flow rate and percent retention with percent of cracking catalyst in this example was better than that observed in Example 4, but not quite as good as in Example 3. In this case, the percent retention plot suggests that the amount of cracking catalyst in general may be in a range of from about 0.25 to about 0.8 percent by weight. The melt flow rate plot suggests a slightly broader range of cracking catalyst, i.e., from about 0.2 to about 1.1 percent by weight. The desired melt flow rate appears to be from about 45 to about 70 g/10 minutes; this range correlates well with the optimum percent retention of tensile strength range.

EXAMPLE 6

The procedure of Example 3 was repeated, except that the Pro-Fax 6301 polypropylene was replaced with Pro-Fax 6601 (Polymer I-E, Himont), which had a melt flow rate of 1 g/10 minutes. The compositions are summarized in Table 11 and the results are summarized in Table 12.

TABLE 11

Summary of Melt-Extrudable Compositions

| Composition | Polymer | Parts Q-858 | Parts PS-A |
|---|---|---|---|
| 6-A | I-E | 0.50 | 1.0 |
| 6-B | I-E | 0.75 | 1.0 |
| 6-C | I-E | 1.00 | 1.0 |
| 6-D | I-E | 1.25 | 1.0 |
| 6-E | I-E | 1.50 | 1.0 |

TABLE 12

Summary of Percent Retention of Tensile Strength Results

Percent Retention[b] by Composition

| Exposure[a] | 6-A | 6-B | 6-C | 6-D | 6-E |
|---|---|---|---|---|---|
| MFR | 32 | 40 | 47 | 64 | 79 |
| 2 | 100 | 100 | 100 | 95 | 98 |
| 4 | 100 | 86 | 92 | 100 | 93 |
| 6 | 100 | 97 | 100 | 92 | 89 |
| 8 | 100 | 87 | 100 | 90 | 88 |
| 10 | 100 | 97 | 99 | 89 | 92 |
| 12 | 93 | 99 | 100 | 91 | 97 |
| 14 | 100 | 98 | 95 | 100 | 87 |
| 16 | 90 | 83 | 86 | 94 | 89 |
| 18 | 93 | 100 | 95 | 95 | 86 |
| 20 | 90 | 100 | 97 | 95 | 83 |
| 22 | 86 | 100 | 100 | 95 | 80 |
| 24 | 86 | 99 | 100 | 87 | 86 |
| 26 | 85 | 100 | 96 | 89 | 71 |
| 28 | 83 | 100 | 90 | 92 | 55 |

[a]Months of exposure to Florida Sun.
[b]Percent retention of tensile strength.

Figure 7:
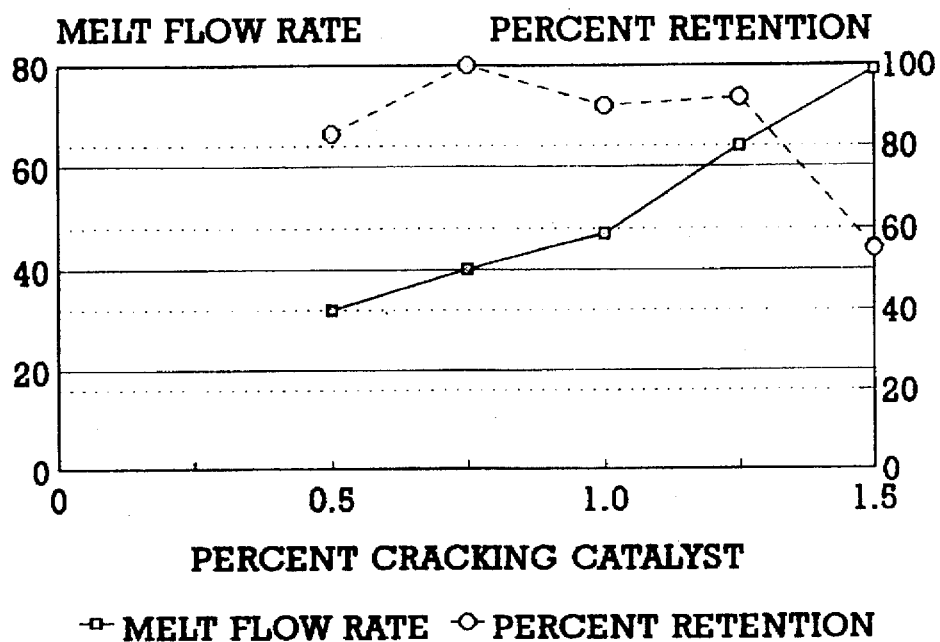

As in previous examples, line graphs in which both melt flow rate and the percent retention of tensile strength versus the percent of cracking catalyst employed were plotted. The graphs are shown in FIG. 7.

The percent retention plot suggests that the amount of cracking catalyst generally should be in a range of from about 0.5 to about 1.5 percent by weight. The melt flow rate plot suggests essentially the same range of cracking catalyst. The desired melt flow rate appears to be from about 30 to about g/10 minutes in order to correlates with the optimum percent retention of tensile strength range.

EXAMPLE 7

The procedure of Example 3 was repeated, except that the Pro-Fax 6301 polypropylene was replaced with Pro-Fax 6701 (Polymer I-F, Himont), which had a melt flow rate of 0.5 g/10 minutes. The compositions are summarized in Table 13 and the results are summarized in Table 14.

TABLE 13

Summary of Melt-Extrudable Compositions

| Composition | Polymer | Parts Q-858 | Parts PS-A |
|---|---|---|---|
| 7-A | I-F | 0.50 | 1.0 |
| 7-B | I-F | 0.75 | 1.0 |
| 7-C | I-F | 1.00 | 1.0 |
| 7-D | I-F | 1.25 | 1.0 |
| 7-E | I-F | 1.50 | 1.0 |
| 7-F | I-F | 1.75 | 1.0 |

TABLE 14

Summary of Percent Retention of Tensile Strength Results

| Exposure[a] | Percent Retention[b] by Composition | | | | | |
|---|---|---|---|---|---|---|
| | 7-A | 7-B | 7-C | 7-D | 7-E | 7-F |
| MFR | 56 | 55 | 36 | 43 | 55 | 66 |
| 2 | 76 | 100 | 100 | 100 | 100 | 88 |
| 4 | 81 | 93 | 100 | 100 | 98 | 88 |
| 6 | 69 | 79 | 100 | 97 | 100 | 89 |
| 8 | 90 | 77 | 100 | 90 | 94 | 79 |
| 10 | 86 | 71 | 100 | 97 | 100 | 84 |
| 12 | 79 | 74 | 100 | 90 | 98 | 84 |
| 14 | 75 | 78 | 90 | 95 | 94 | 75 |
| 16 | 88 | 85 | 100 | 92 | 84 | 78 |
| 18 | 93 | 80 | 85 | 89 | 93 | 82 |
| 20 | 84 | 79 | 95 | 86 | 89 | 77 |
| 22 | 75 | 77 | 100 | 83 | 85 | 71 |
| 24 | 83 | 69 | 91 | 82 | 85 | 80 |
| 26 | 69 | 77 | 89 | 91 | 93 | 72 |
| 28 | 55 | 77 | 87 | 100 | 100 | 63 |

[a]Months of exposure to Florida sun.
[b]Percent retention of tensile strength.

Figure 8:
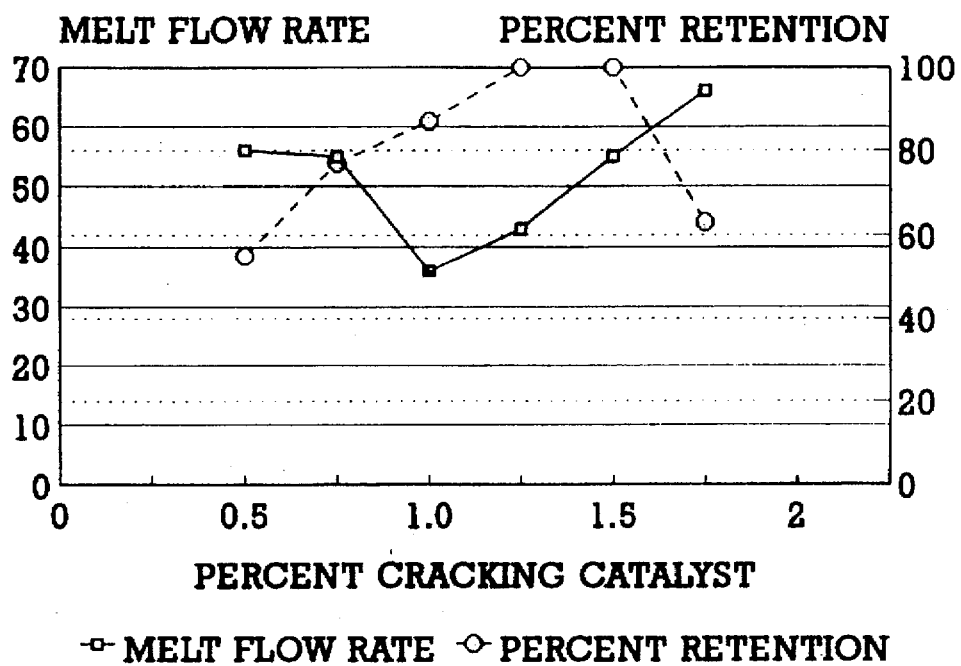

Line graphs in which both melt flow rate and the percent retention of tensile strength versus the percent of cracking catalyst employed were plotted as described in Example 3. The graphs are shown in FIG. 8.

In this case, the percent retention plot suggests that the amount of cracking catalyst in general should be from about 0.75 to about 1.6 percent by weight. The melt flow rate plot suggests a broader range of cracking catalyst, i.e., from about 0.5 to about 1.75 percent by weight. However, the desired melt flow rate appears to be from about 35 to about 60 g/10 minutes.

EXAMPLE 8

The procedure of Example 3 was repeated, except that the Pro-Fax 6301 polypropylene was replaced with Pro-Fax 6801 (Polymer I-G, Himont), which had a melt flow rate of 0.3 g/10 minutes. The compositions are summarized in Table 15 and the results are summarized in Table 16.

TABLE 15

Summary of Melt-Extrudable Compositions

| Composition | Polymer | Parts Q-858 | Parts PS-A |
|---|---|---|---|
| 8-A | I-G | 1.00 | 1.0 |
| 8-B | I-G | 1.25 | 1.0 |
| 8-C | I-G | 1.50 | 1.0 |
| 8-D | I-G | 1.75 | 1.0 |
| 8-E | I-G | 2.00 | 1.0 |
| 8-F | I-G | 2.25 | 1.0 |

TABLE 16

Summary of Percent Retention of Tensile Strength Results

| Exposure[a] | Percent Retention[b] by Composition | | | | | |
|---|---|---|---|---|---|---|
| | 8-A | 8-B | 8-C | 8-D | 8-E | 8-F |
| MFR | 48 | 48 | 61 | 70 | 87 | 90 |
| 2 | 98 | 92 | 84 | 100 | 100 | 82 |
| 4 | 100 | 100 | 90 | 100 | 100 | 90 |
| 6 | 96 | 85 | 79 | 95 | 83 | 78 |
| 8 | 89 | 65 | 69 | 100 | 82 | 76 |
| 10 | 90 | 73 | 68 | 99 | 84 | 79 |
| 12 | 100 | 76 | 70 | 90 | 88 | 83 |
| 14 | 90 | 69 | 55 | 79 | 84 | 78 |
| 16 | 100 | 59 | 55 | 100 | 81 | 76 |
| 18 | 97 | 56 | 59 | 88 | 80 | 78 |
| 20 | 97 | 56 | 57 | 85 | 76 | 76 |
| 22 | 98 | 55 | 54 | 83 | 72 | 74 |
| 24 | 83 | 59 | 56 | 98 | 84 | 82 |
| 26 | 74 | 67 | 58 | 100 | 62 | 61 |
| 28 | 65 | 75 | 60 | 100 | 39 | 40 |

[a]Months of exposure to Florida sun.
[b]Percent retention of tensile strength.

Figure 9:
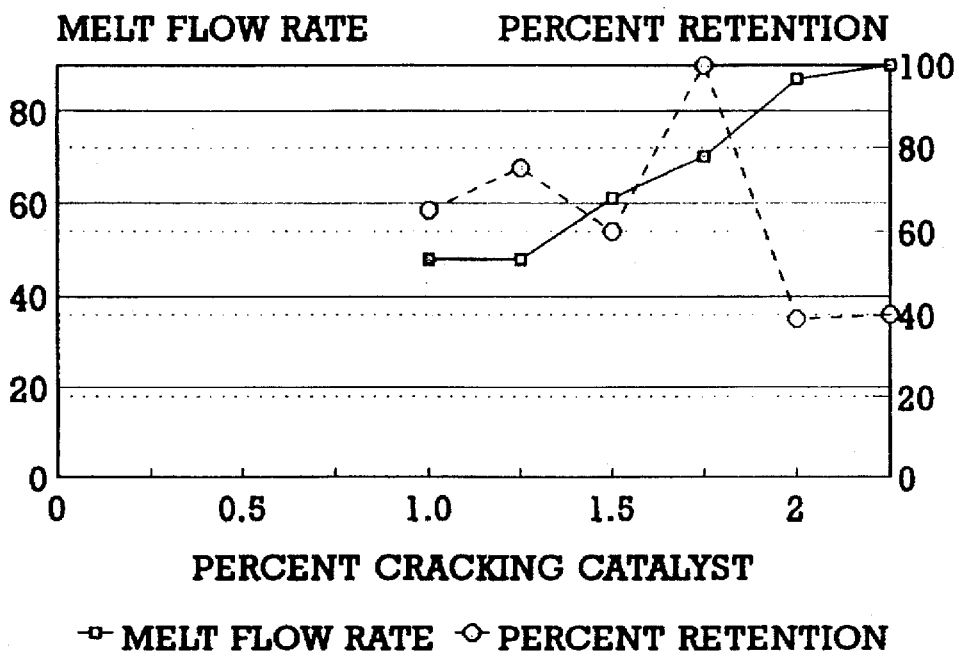

Line graphs in which both melt flow rate and the percent retention of tensile strength versus the percent of cracking catalyst employed were plotted as described in Example 3; the graphs are shown in FIG. 9.

The percent retention plot suggests that the amount of cracking catalyst in general should be from about 1.6 to about 1.9 percent by weight, whereas the melt flow rate plot suggests a broader range of cracking catalyst, i.e., from about 1.0 to about 1.8 percent by weight. However, the desired melt flow rate appears to be from about 45 to about 70 g/10 minutes. However, a narrow range, i.e., from about 65 to about 75 g/10 minutes, is necessary in order to correlate melt flow rate with the optimum percent retention of tensile strength range.

While the specification has been described in detail with respect to specific embodiments thereof, it will be appreciated that those skilled in the art, upon attaining an understanding of the foregoing, may readily conceive of alterations to, variations of, and equivalents to these embodiments. For example, either composition described herein also may include, byway of example only, pigments, colorants, delustrants, nucleating agents, thermal stabilizers, and the like, as is well known in the art.

What is claimed is:

1. A method of improving the effectiveness of a photostabilizer in reducing the deleterious effects of actinic radiation on a polypropylene composition, which method comprises:

compounding a thermoplastic polypropylene composition comprising:

a first thermoplastic polypropylene having a melt flow rate lower than 18 g/10 minutes at a temperature of 230° C. and a load of 2.16 kg, a polydispersity greater than about 2.6, and a Z-average molecular weight greater than about 300,000;

a second thermoplastic polypropylene having a melt flow rate higher than 18 g/10 minutes at a temperature of 230° C. and a load of 2.16 kg, a polydispersity equal to or less than 2.6, and a Z-average molecular weight equal to or less than 300,000 as determined by gel permeation chromatography, wherein the weight ratio of the first polypropylene to the second polypropylene is in a range of from about 60:40 to about 10:90; and a photostabilizer; to give a melt-extrudable thermoplastic polypropylene composition having a melt flow rate in a range of from about 18 to about 100 g/10 minutes at a temperature of 230° C. and a load of 2.16 kg and an improved effectiveness against the deleterious effects of actinic radiation when compared to a composition consisting of the photostabilizer and either the first or the second polypropylene.

2. The method of claim 1, in which the first polypropylene has a melt flow rate in a range of from about 1 to about 18 g/10 minutes at a temperature of 230° C. and a load of 2.16 kg.

3. The method of claim 1, in which the second polypropylene has a melt flow rate in a range of from about 20 to about 50 g/10 minutes at a temperature of 230° C. and a load of 2.16 kg.

4. The method of claim 1, which further comprises forming continuous fibers by melt extruding the compounded composition through a die.

5. The method of claim 4, which further comprises quenching the continuous fibers to a solid state and drawing the fibers.

6. The method of claim 5, which further comprises randomly depositing the fibers on a moving foraminous surface as a web of entangled fibers.

7. The method of claim 6, which further comprises pattern bonding the web of entangled fibers by the application of heat and pressure.

8. The method of claim 1, in which the photostabilizer is a hindered amine.

9. A method of forming a nonwoven web comprising the steps of:

compounding a thermoplastic polypropylene composition comprising:

a first thermoplastic polypropylene having a melt flow rate lower than 18 g/10 minutes at a temperature of 230° C. and a load of 2.16 kg, a polydispersity greater than about 2.6, and a Z-average molecular weight greater than about 300,000;

a second thermoplastic polypropylene having a melt flow rate higher than 18 g/10 minutes at a temperature of 230° C. and a load of 2.16 kg, a polydispersity equal to or less than 2.6, and a Z-average molecular weight equal to or less than 300,000 as determined by gel permeation chromatography, wherein the weight ratio of the first polypropylene to the second polypropylene is in a range of from about 60:40 to about 10:90; and a photostabilizer; to give a melt-extrudable thermoplastic polypropylene composition having a melt flow rate in a range of from about 18 to about 100 g/10 minutes at a temperature of 230° C. and a load of 2.16 kg;

forming continuous fibers by melt extruding the compounded composition through a die;

quenching the continuous fibers to a solid state;

drawing the fibers; and randomly depositing the fibers on a moving foraminous surface as a web of entangled fibers.

10. The method of claim 9, in which the first polypropylene has a melt flow rate in a range of from about 1 to about 18 g/10 minutes at a temperature of 230° C. and a load of 2.16 kg.

11. The method of claim 9, in which the second polypropylene has a melt flow rate in a range of from about 20 to about 50 g/10 minutes at a temperature of 230° C. and a load of 2.16 kg.

12. The method of claim 9, which further comprises pattern bonding the web of entangled fibers by the application of heat and pressure.

13. The method of claim 9, in which the photostabilizer is a hindered amine.

* * * * *